United States Patent
Kaizo et al.

(10) Patent No.: US 9,270,211 B2
(45) Date of Patent: Feb. 23, 2016

(54) ELECTRIC POWER TOOL

(71) Applicant: Panasonic Corporation, Osaka (JP)

(72) Inventors: Hiroyuki Kaizo, Kyoto (JP); Tadashi Arimura, Kyoto (JP); Toshiharu Ohashi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 64 days.

(21) Appl. No.: 14/200,260

(22) Filed: Mar. 7, 2014

(65) Prior Publication Data

US 2014/0265948 A1    Sep. 18, 2014

(30) Foreign Application Priority Data

Mar. 13, 2013 (JP) ................. 2013-050144

(51) Int. Cl.
*H02P 6/00* (2006.01)
*H02J 7/00* (2006.01)
*H02P 7/00* (2006.01)
*H02M 3/156* (2006.01)

(52) U.S. Cl.
CPC .............. *H02P 6/002* (2013.01); *H02J 7/0065* (2013.01); *H02P 7/0066* (2013.01); *H02M 3/156* (2013.01); *H02P 2201/09* (2013.01)

(58) Field of Classification Search
USPC .............................. 173/176; 318/400.34, 139
See application file for complete search history.

(56) References Cited

U.S. PATENT DOCUMENTS

| | | | | |
|---|---|---|---|---|
| 5,747,953 A * | 5/1998 | Philipp | ......................... | 318/139 |
| 2003/0173940 A1 | 9/2003 | Kovarik | | |
| 2003/0234623 A1 * | 12/2003 | Douglas | ......................... | 318/254 |
| 2006/0220600 A1 | 10/2006 | Greene | | |
| 2007/0043490 A1 | 2/2007 | Yokota et al. | | |
| 2008/0216458 A1 | 9/2008 | Lucas | | |
| 2009/0071671 A1 * | 3/2009 | Zhong et al. | .................. | 173/176 |
| 2009/0284205 A1 * | 11/2009 | Yamamoto | ............ | B60R 21/017 318/490 |
| 2011/0214894 A1 | 9/2011 | Harada et al. | | |

FOREIGN PATENT DOCUMENTS

| | | |
|---|---|---|
| CN | 1919677 A | 2/2007 |
| CN | 102015215 A | 4/2011 |
| DE | 3938787 A1 | 5/1991 |
| EP | 0 445 084 A2 | 9/1991 |

(Continued)

OTHER PUBLICATIONS

Chinese Office Action and Search Report for corresponding Chinese Application No. 201410087491.8 issued Jun. 9, 2015 (with English translation of Search Report).

(Continued)

*Primary Examiner* — Eduardo Colon Santana
*Assistant Examiner* — Cortez Cook
(74) *Attorney, Agent, or Firm* — Renner, Otto, Boisselle & Sklar, LLP

(57) ABSTRACT

An electric power tool includes a power supply, a motor capable of being driven in a forward rotation mode or a reverse rotation mode, and a voltage step-up unit capable of performing a voltage step-up operation to raise a voltage supplied from the power supply and supply a raised voltage to the motor. The voltage step-up unit is configured to change the voltage step-up operation in accordance with whether a rotation mode of the motor is the forward rotation mode or the reverse rotation mode.

12 Claims, 6 Drawing Sheets

(56) References Cited

FOREIGN PATENT DOCUMENTS

| | | |
|---|---|---|
| EP | 2 674 262 A1 | 12/2013 |
| JP | 63-191 B2 | 1/1988 |
| JP | 2011-161545 A | 8/2011 |
| JP | 2011-201006 A | 10/2011 |
| JP | 2011-212798 A | 10/2011 |
| JP | 2012-035349 A | 2/2012 |
| JP | 2012-135827 A | 7/2012 |
| WO | 2012/108372 A1 | 8/2012 |

OTHER PUBLICATIONS

Extended European Search Report for corresponding European Application No. EP 14 15 8458 dated Oct. 29, 2015.

* cited by examiner

ELECTRIC POWER TOOL

CROSS-REFERENCE TO RELATED APPLICATIONS

This application is based upon and claims the benefit of priority from prior Japanese Patent Application No. 2013-050144, filed on Mar. 13, 2013, the entire contents of which are incorporated herein by reference.

FIELD

The present invention relates to an electric power tool.

BACKGROUND

Japanese Laid-Open Patent Publication No. 2012-35349 describes an example of a conventional electric power tool. The electric power tool includes a power supply, a motor, and a voltage step-up unit for raising a voltage supplied from the power supply and supplying the raised voltage to the motor. In this structure, even when power capacity of the power supply is small, the output of the motor may be ensured in a preferable manner.

The electric power tool including the voltage step-up unit consumes power from the power supply more rapidly than an electric power tool including no voltage step-up unit. This increases the number of times the power supply is replaced.

SUMMARY

An object of the present invention is to provide an electric power tool capable of reducing power consumption of the power supply while ensuring a preferable motor output.

One aspect of the present invention is an electric power tool. The electric power tool includes a power supply, a motor capable of being driven in a forward rotation mode or a reverse rotation mode, and a voltage step-up unit configured to operate a voltage step-up operation to raise a voltage supplied from the power supply and supply a raised voltage to the motor. The voltage step-up unit is configured to change the voltage step-up operation in accordance with whether a rotation mode of the motor is the forward rotation mode or the reverse rotation mode.

According to this aspect, an electric power tool capable of reducing power consumption of the power supply while ensuring a preferable motor output.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

First Embodiment

Figure 1:
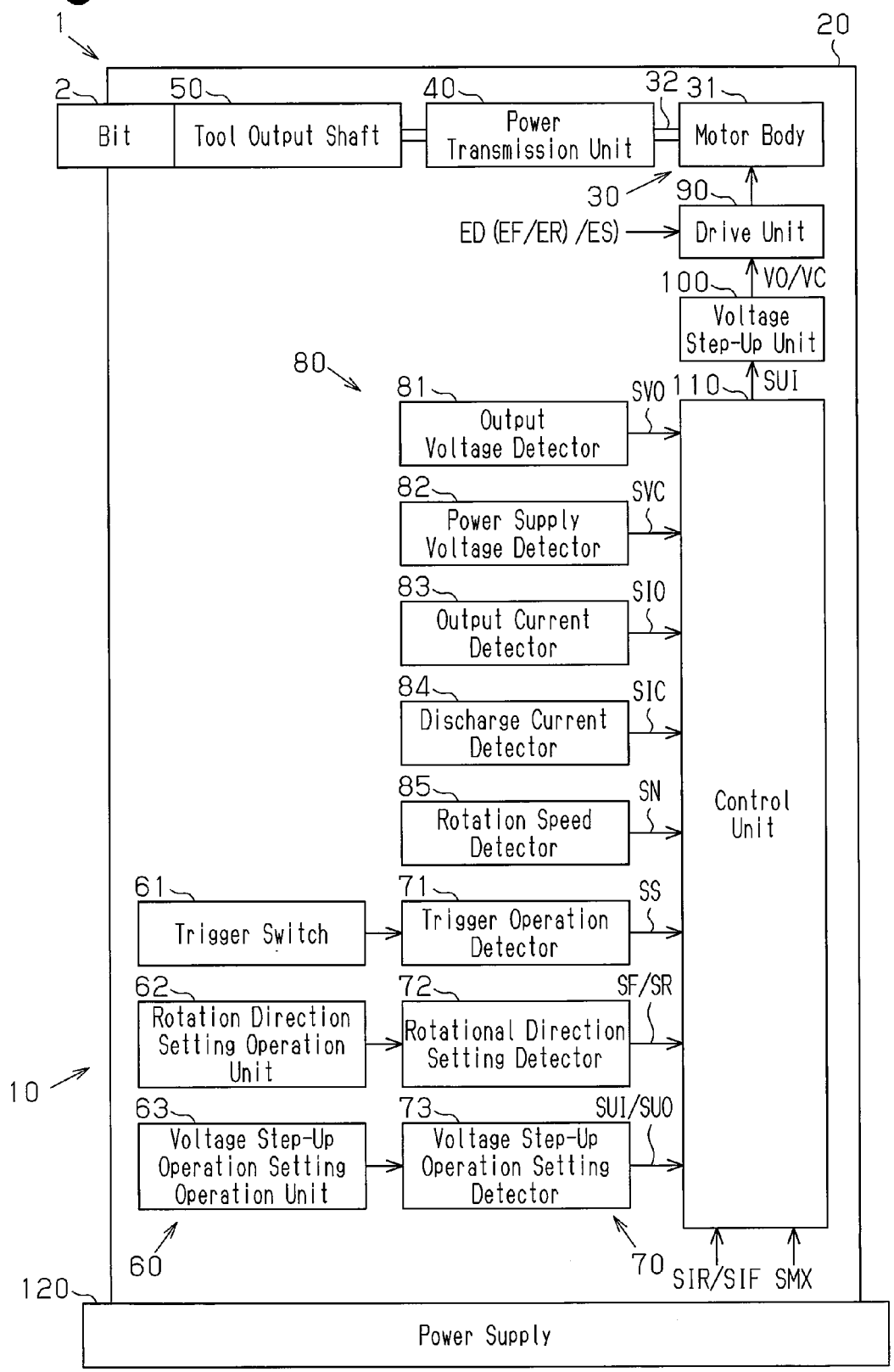
FIG. 1 is a block diagram of an electric power tool in a first embodiment.

FIG. 1 shows an embodiment of an electric power tool 1. An example of the electric power tool 1 is a drill driver. The electric power tool 1 includes an electric power tool body 10 and a power supply 120 that are attached to and detached from each other. The electric power tool 1 transmits a torque to a working subject component via a bit 2 connected to the electric power tool body 10. The working subject component is a screw or a bolt.

The electric power tool body 10 includes a housing 20, a motor 30, a power transmission unit 40, a tool output shaft 50, an operation unit 60, an operation detection unit 70, a load detection unit 80, a drive unit 90, a voltage step-up unit 100, and a control unit 110. The electric power tool body 10 can be attached to and detached from the bit 2. A power block of the electric power tool body 10 is driven by power supplied from a power supply 120. The power block of the electric power tool body 10 includes the motor 30, the operation detection unit 70, the load detection unit 80, the drive unit 90, the voltage step-up unit 100, and the control unit 110.

The housing 20 can be grasped by the user. The housing 20 stores the components of the electric power tool body 10. The housing 20 has a part connected to the power supply 120 in its lower portion. The housing 20 forms part of the power transmission unit 40.

The motor 30 is arranged in the housing 20. The motor 30 includes a motor body 31 and a drive shaft 32 that serves as an output shaft of the motor 30. The motor 30 is driven by power from the drive unit 90. The motor 30 can rotate in a forward rotation mode and a reverse rotation mode. In the forward rotation mode, the drive shaft 32 rotates in the forward rotational direction. In the reverse rotation mode, the drive shaft 32 rotates in the reverse rotational direction.

The power transmission unit 40 is arranged in the housing 20. The power transmission unit 40 decelerates rotation of the drive shaft 32, and transmits the decelerated rotation to the tool output shaft 50. The power transmission unit 40 includes, for example, a plurality of planet gear mechanisms (not shown).

The tool output shaft 50 has a bottom end located in the housing 20 and a front end exposed from the housing 20. The tool output shaft 50 rotates the bit 2 by a torque transmitted from the power transmission unit 40. The tool output shaft 50 changes a fastening torque TC acting on the working subject component.

The operation unit 60 includes a trigger switch 61, a rotation direction setting operation unit 62, and a voltage step-up operation setting operation unit 63. The operation unit 60 is operable by the user and used to change use conditions of the electric power tool 1.

The trigger switch 61 serves as a human machine interface and is used to adjust the output of the motor 30. The user can continuously operate the trigger switch 61 in a range from an output stop position to a maximum output position. The pushing amount of the trigger switch 61 into the housing 20 is the smallest at the output stop position and is the largest at the maximum output position.

The rotation direction setting operation unit 62 serves as a human machine interface and is used to set the rotational direction of the tool output shaft 50. The user can selectively operate the rotation direction setting operation unit 62 to a forward rotation setting position or a reverse rotation setting position. When the rotation direction setting operation unit 62 is operated to the forward rotation setting position, the rotational direction of the motor 30 is set to the forward rotational direction. When the rotation direction setting operation unit 62 is operated to the reverse rotation setting position, the rotational direction of the motor 30 is set to the reverse rotational direction.

The voltage step-up operation setting operation unit 63 serves as a human machine interface and is used to set the voltage step-up operation of the voltage step-up unit 100. The user can selectively operate the voltage step-up operation setting operation unit 63 to a voltage step-up effective position or a voltage step-up ineffective position. When the voltage step-up operation setting operation unit 63 is operated to the voltage step-up effective position, the voltage step-up unit 100 performs the voltage step-up operation. When the voltage step-up operation setting operation unit 63 is set to the voltage step-up ineffective position, the voltage step-up unit 100 does not perform the voltage step-up operation.

The operation detection unit 70 includes a trigger operation detector 71, a rotation direction setting detector 72, and a voltage step-up operation setting detector 73. The operation detection unit 70 supplies a voltage signal corresponding to the operation of each of the trigger switch 61, the rotation direction setting operation unit 62, and the voltage step-up operation setting operation unit 63 to the control unit 110.

The trigger operation detector 71 detects an operational position of the trigger switch 61 and supplies a trigger operation signal SS, corresponding to the operational position of the trigger switch 61, to the control unit 110. When the trigger switch 61 is located at any operational position other than the output stop position, the trigger operation detector 71 generates the trigger operation signal SS corresponding to an operational amount of the trigger switch 61. When the trigger switch 61 is located at the output stop position, the trigger operation detector 71 does not output the trigger operation signal SS.

The rotation direction setting detector 72 detects an operational position of the rotation direction setting operation unit 62 and supplies a signal, corresponding to the operational position of the rotation direction setting operation unit 62, to the control unit 110. When the rotation direction setting operation unit 62 is located at the forward rotation setting position, the rotation direction setting detector 72 supplies a forward rotation setting signal SF to the control unit 110. When the rotation direction setting operation unit 62 is located at the reverse rotation setting position, the rotation direction setting detector 72 supplies a reverse rotation setting signal SR to the control unit 110.

The voltage step-up operation setting detector 73 detects an operational position of the voltage step-up operation setting operation unit 63 and supplies a voltage step-up setting signal, corresponding to the operational position of the voltage step-up operation setting operation unit 63, to the control unit 110. When the voltage step-up operation setting operation unit 63 is located at the voltage step-up effective position, the voltage step-up operation setting detector 73 supplies a voltage step-up driving setting signal SUI to the control unit 110. When the voltage step-up operation setting operation unit 63 is located at the voltage step-up ineffective position, the voltage step-up operation setting detector 73 supplies a voltage step-up stop setting signal SUO to the control unit 110. Each of the voltage step-up driving setting signal SUI and the voltage step-up stop setting signal SUO is an example of the voltage step-up setting signal.

The load detection unit 80 includes an output voltage detector 81, a power supply voltage detector 82, an output current detector 83, a discharge current detector 84, and a rotation speed detector 85. The load detection unit 80 generates a voltage signal based on parameters which correlate with a load of the electric power tool 1 and supplies the voltage signal to the control unit 110. The signal outputted from each of the detectors 81 to 85 is an example of a load detection signal.

The output voltage detector 81 detects the raised voltage (output voltage VO) generated by the voltage step-up unit 100 and supplies an output voltage signal SVO, corresponding to the output voltage VO, to the control unit 110.

The power supply voltage detector 82 detects a power supply voltage VC supplied from the power supply 120 and supplies a power supply voltage signal SVC, corresponding to the power supply voltage VC, to the control unit 110.

The output current detector 83 detects a current (output current IO) supplied from the voltage step-up unit 100 to the motor 30 and supplies an output current signal SIO, corresponding to the output current IO, to the control unit 110.

The discharge current detector 84 detects a current (discharge current IC) supplied from the power supply 120 and supplies a discharge current signal SIC, corresponding to the discharge current IC, to the control unit 110.

The rotation speed detector 85 detects a drive shaft rotation speed NM, which is the rotation speed of the drive shaft 32, and supplies a detection rotation speed signal SN, corresponding to the drive shaft rotation speed NM, to the control unit 110. For example, the drive shaft rotation speed NM represents the rotation amount of the drive shaft 32 per unit time.

The drive unit 90 operates according to a signal from the control unit 110. In response to a rotational driving signal ED from the control unit 110, the drive unit 90 supplies a driving current (input current) to the motor 30. For example, the drive unit 90 supplies the driving current according to command information of the rotational driving signal ED to the motor 30 by a switching operation. In response to a forward rotation driving signal EF from the control unit 110, the drive unit 90 drives the motor 30 in the forward rotation mode. In response to a reverse rotation driving signal ER from the control unit 110, the drive unit 90 drives the motor 30 in the reverse rotation mode. In response to a rotation stop signal ES from the control unit 110, the drive unit 90 stops supply of the driving current to the motor 30.

The control unit 110 detects a load of the electric power tool 1 in accordance with the load detection signal from the load detection unit 80. One example of a load of the electric power tool 1 is a load torque TL acting on the tool output shaft 50. The control unit 110 determines the magnitude of the load torque TL by at least one of following ways.

For example, the control unit 110 determines the magnitude of the load torque TL based on the output current IO. Alternatively, the control unit 110 determines the magnitude of the load torque TL based on the output current IO and the output voltage VO. Alternatively, the control unit 110 determines the magnitude of the load torque TL based on the discharge current IC. Alternatively, the control unit 110 determines the magnitude of the load torque TL based on the discharge current IC and the power supply voltage VC. The load torque acting on the drive shaft 32 correlates with the load torque TL acting on the tool output shaft 50. Thus, the control unit 110 also detect the load torque of the drive shaft 32 as the load of the electric power tool 1 based on the load detection signal of the load detection unit 80.

The control unit 110 calculates a calculation value of the drive shaft rotation speed NM in accordance with the detection rotation speed signal SN. In response to the trigger operation signal SS, the control unit 110 supplies the rotational driving signal ED to the drive unit 90. The control unit 110 supplies the rotation stop signal ES to the drive unit 90 based on the calculation value of the drive shaft rotation speed NM. In response to the forward rotation setting signal SF, the control unit 110 supplies the forward rotation driving signal EF to the drive unit 90. In response to the reverse rotation setting signal SR, the control unit 110 supplies the reverse rotation driving signal ER to the drive unit 90.

Figure 2:
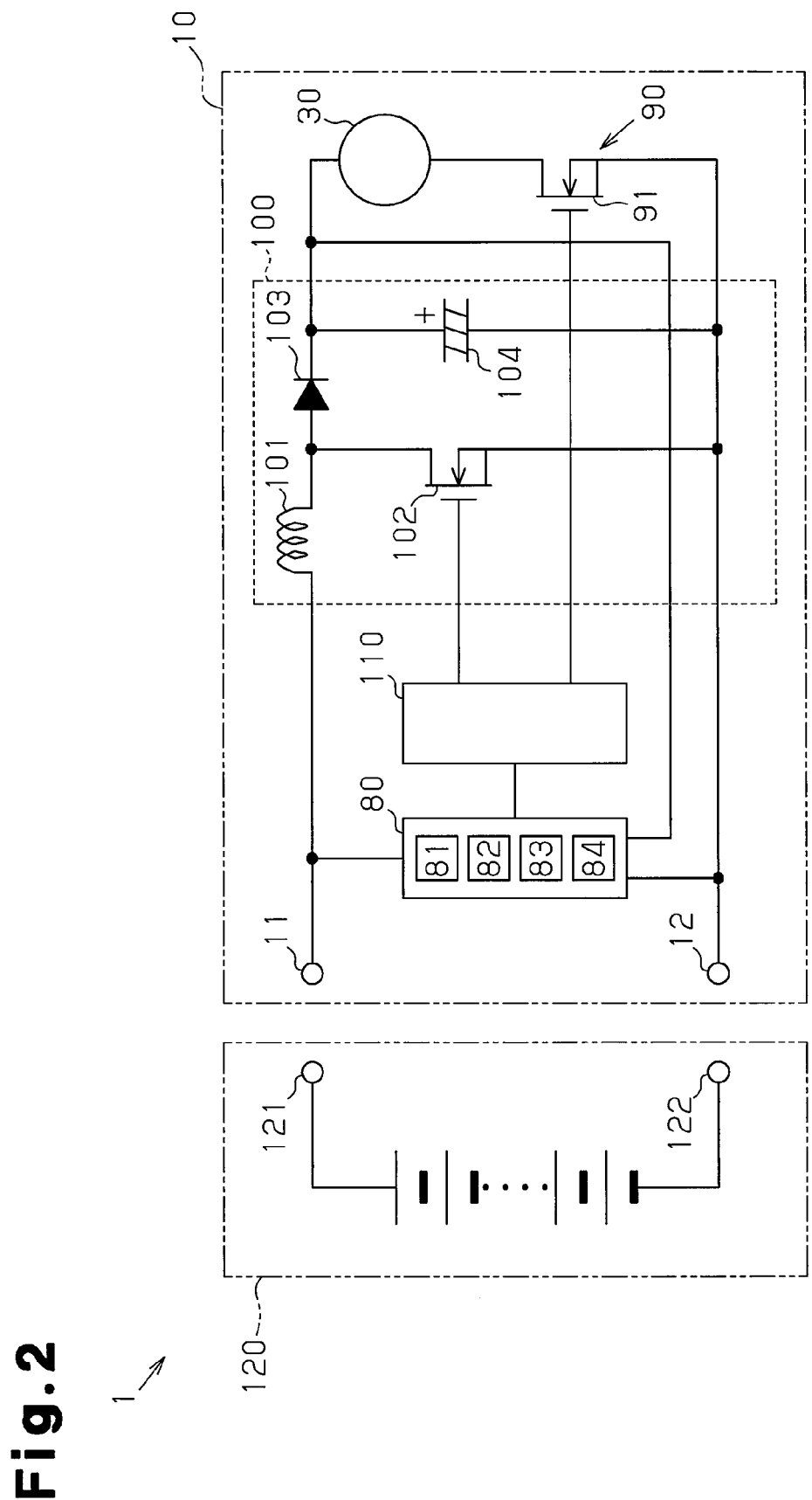
FIG. 2 is a circuit diagram of the electric power tool in the first embodiment.

FIG. 2 shows an example of a circuit structure of the electric power tool 1.

The electric power tool body 10 includes a positive input terminal 11 and a negative input terminal 12. For example, the power supply 120 is provided as a battery pack. The power supply 120 includes a positive input terminal 121 and a negative input terminal 122. When the power supply 120 is connected to the electric power tool body 10, the positive input terminal 11 is connected to the positive input terminal 121, and the negative input terminal 12 is connected to the negative input terminal 122.

The voltage step-up unit 100 includes, for example, a step-up chopper circuit. The step-up chopper circuit includes an inductor 101, a switching element 102, a diode 103, and a smoothing capacitor 104. The drive unit 90 includes a switching element 91. The switching element 102 and the switching element 91 are driven by a signal supplied from the control unit 110. The voltage step-up unit 100 raises a voltage supplied from the power supply 120 by the operation of the switching element 102 and supplies the raised voltage to the motor 30.

For example, the output voltage detector 81 detects a potential difference between two terminals of the smoothing capacitor 104 as an output voltage VO. For example, the power supply voltage detector 82 detects a potential difference between the positive input terminal 11 and the negative input terminal 12 as the power supply voltage VC. For example, the output current detector 83 detects a current flowing through the diode 103 as the output current IO. For example, the discharge current detector 84 detects a current flowing from the positive input terminal 11 to the inductor 101 as the discharge current IC.

In the first embodiment, the control unit 110 controls the voltage step-up unit 100 by a reverse rotation mode voltage step-up control. In the reverse rotation mode voltage step-up control, the control unit 110 controls the voltage step-up unit 100 based on at least one of an output signal of the operation detection unit 70 and an output signal of the load detection unit 80. The reverse rotation mode voltage step-up control is achieved by using hardware, for example. The control unit 110 controls the operation of each functional block in the control unit 110 formed by hardware to perform the reverse rotation mode voltage step-up control.

The reverse rotation mode voltage step-up control has a following technical aspect. Following description is only an example of one aspect of the reverse rotation mode voltage step-up control and does not intend to limit the reverse rotation mode voltage step-up control to specific control based on the following description. Thus, the reverse rotation mode voltage step-up control may be performed from an aspect other than the aspect described below.

The reverse rotation mode of the motor 30 is used mainly in a fastening torque decreasing operation of decreasing the fastening torque of a working subject component (for example, a screw etc.). The fastening torque decreasing operation typically includes an operation of extracting the working subject component from a fastened object that is fastened with the working subject component by a given fastening torque.

When the motor 30 rotates in the reverse rotation mode, a large load torque TL acts on the tool output shaft 50 until the state where the working subject component is seated in the fastened object is released. Thus, when the output of the motor 30 is not a preferable output value, it takes a long time to complete the fastening torque decreasing operation. Therefore, it is preferable that when the motor 30 rotates in the reverse rotation mode, the voltage supplied to the motor 30 be high.

When the motor 30 rotates in the reverse rotation mode, the voltage step-up unit 100 raises the voltage from the power supply 120 and supplies the raised voltage to the motor 30. This may ensure the preferable output of the motor 30 while reducing the time required for the fastening torque decreasing operation.

In the case where the operation of the voltage step-up unit 100 is performed, as compared to the case where the voltage step-up operation is not performed, power consumption of the power supply 120 becomes larger. Thus, the use of the voltage step-up unit 100 may reduce the time required for the fastening torque decreasing operation but increase the number of times the power supply 120 (battery pack) is replaced.

Thus, the electric power tool 1 in the first embodiment performs the reverse rotation mode voltage step-up control so as to achieve both of reduction of the time required for the fastening torque decreasing operation and reduction of power consumption of the power supply 120.

The control unit 110 performs the reverse rotation mode voltage step-up control as follows. A period from start of the reverse rotation of the motor 30 to stop of the reverse rotation of the motor 30 will be hereinafter referred to as "reverse rotation driving period".

At a start timing of the reverse rotation driving period, the control unit 110 instructs the voltage step-up unit 100 to start the voltage step-up operation in reverse rotation. The voltage step-up unit 100 performs the voltage step-up operation in reverse rotation and thereby supplies the output voltage VO that is higher than the power supply voltage VC and is suitable for the reverse rotation mode to the motor 30. In other words, the voltage step-up unit 100 raises the power supply voltage VC at the voltage step-up level suitable for the reverse rotation mode. The start timing of the reverse rotation driving period is included in a period from start of supply of the input current to the motor 30 to acquisition of the rotational output of the motor 30 which corresponds to the input current.

The fastening torque of the fastened working subject component has a maximum value at the start timing of the reverse rotation driving period. Therefore, when the torque of the motor 30 is small at start of the reverse rotation driving period, it is difficult to effectively reduce the fastening torque, that is, smoothly detach the working subject component. At start of the reverse rotation driving period, the control unit 110 instructs the voltage step-up unit 100 to start the voltage step-up operation in reverse rotation, thereby increasing the torque of the motor 30. This may effectively reduce the fastening torque at start of the fastening torque decreasing operation.

In an initial stage of the reverse rotation driving period of the motor 30, the control unit 110 instructs the voltage step-up unit 100 to perform the voltage step-up operation in reverse rotation. The working subject component that has been fastened is seated in a seat part of the fastened object. Thus, in the initial stage of the reverse rotation driving period, a frictional force between the working subject component and the fastened object is large. That is, the fastening torque of the working subject component is large in the initial stage of the reverse rotation driving period. Thus, when the torque of the motor 30 in the initial stage of the reverse rotation driving period is small, it is difficult to effectively reduce the fastening torque. Therefore, the control unit 110 instructs the voltage step-up unit 100 to perform the voltage step-up operation in reverse rotation in the initial stage of the reverse rotation driving period, thereby keeping the state where the torque of the motor 30 increases. This may effectively reduce the fastening torque in the initial stage of the fastening torque decreasing operation.

In an intermediate stage of the reverse rotation driving period of the motor 30, the control unit 110 instructs the voltage step-up unit 100 to still perform the voltage step-up operation in reverse rotation. When the state where the working subject component is seated in the fastened object is released, a frictional force of a screw part of the working subject component mainly contributes to the fastening torque. In this case, as a screwing amount of the working subject component into the fastened object decreases, the frictional force of the screw part decreases.

The fastening torque of the working subject component is smaller in the intermediate stage of the reverse rotation driving period than in the initial stage. Thus, even when the torque of the motor 30 is smaller in the intermediate stage of the reverse rotation driving period than that in the initial stage, the fastening torque may be easily reduced. However, the fastening torque caused by the frictional force of the screw part of the working subject component is still present. Therefore, it is preferable that the torque of the motor 30 be relatively large until the fastening torque is decreased to a predetermined value.

Accordingly, in the intermediate stage of the reverse rotation driving period, the control unit 110 instructs the voltage step-up unit 100 to still perform the voltage step-up operation in reverse rotation. As a result, also in the intermediate stage of the fastening torque decreasing operation, the fastening torque may be easily reduced.

In a later stage of the reverse rotation driving period of the motor 30, the control unit 110 instructs the voltage step-up unit 100 to stop the voltage step-up operation in reverse rotation. When the screwing amount of the working subject component into the fastened object is small, the frictional force and the axial force of the screw part are sufficiently small.

That is, the fastening torque of the working subject component is sufficiently small. Thus, even when the torque of the motor 30 is smaller in the later stage of the reverse rotation driving period than in the initial stage and the intermediate stage, the fastening torque may be easily reduced.

Accordingly, in the later stage of the reverse rotation driving period, the control unit 110 instructs the voltage step-up unit 100 to stop the voltage step-up operation in reverse rotation. This may reduce power consumption of the power supply 120.

Figure 3:
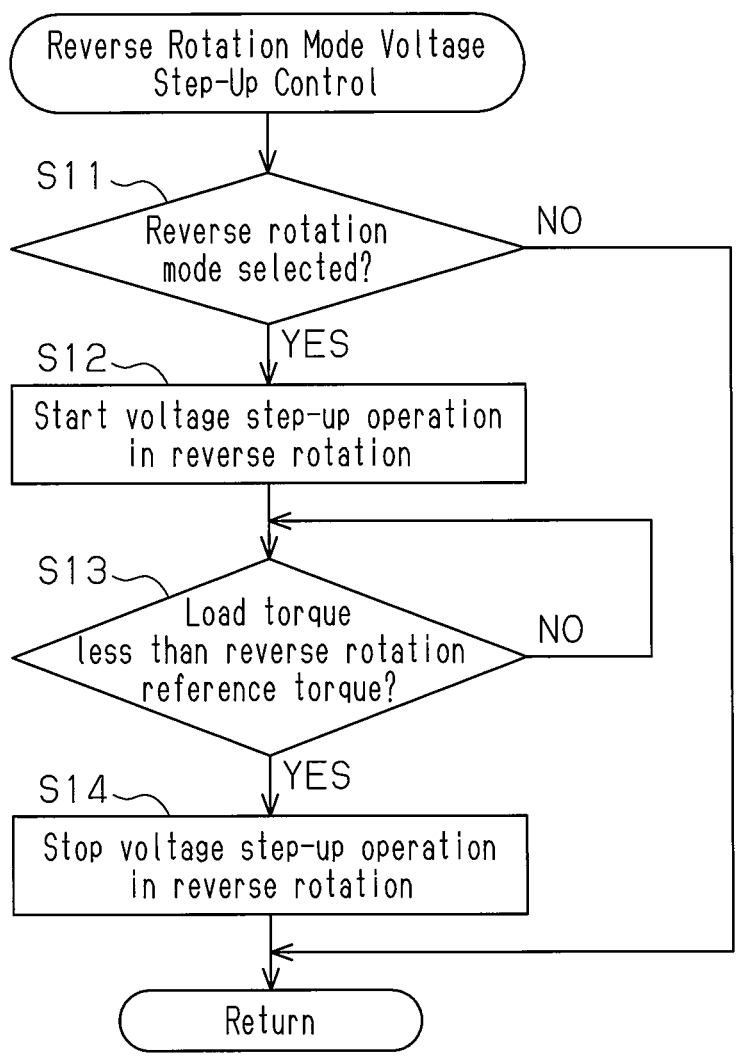
FIG. 3 is a flow chart showing control of the electric power tool in the first embodiment.

FIG. 3 is a flow chart showing the reverse rotation mode voltage step-up control.

When reverse rotation of the motor 30 starts, the control unit 110 starts the reverse rotation mode voltage step-up control. For example, when receiving the trigger operation signal SS from the trigger operation detector 71, the control unit 110 starts the reverse rotation mode voltage step-up control.

In step S11, the control unit 110 determines whether or not the rotation mode of the motor 30 is set (selected) to the reverse rotation mode. When receiving the reverse rotation setting signal SR from the rotation direction setting detector 72, the control unit 110 determines that the reverse rotation mode is set. When the reverse rotation mode is not set, the control unit 110 finishes the reverse rotation mode voltage step-up control. When the reverse rotation mode is set, the control unit 110 proceeds to step S12.

In step S12, the control unit 110 instructs the voltage step-up unit 100 to start the voltage step-up operation in reverse rotation. The control unit 110 supplies the voltage step-up driving setting signal SUI to the voltage step-up unit 100. The voltage step-up unit 100 drives the switching element 102 in accordance with the voltage step-up driving setting signal SUI.

In step S13, the control unit 110 determines whether or not the load torque TL is less than a reverse rotation reference torque TXR. For example, the control unit 110 determines whether or not the load torque TL is less than the reverse rotation reference torque TXR based on the output current signal SIO and a reverse rotation reference current signal SIR. The reverse rotation reference current signal SIR that represents a reverse rotation reference current IXR is supplied to the control unit 110. The reverse rotation reference torque TXR corresponds to "reverse rotation reference load".

When the load torque TL is less than the reverse rotation reference torque TXR, the output current IO is less than the reverse rotation reference current IXR. Thus, when the output current IO is less than the reverse rotation reference current IXR, the control unit 110 determines that the load torque TL is less than the reverse rotation reference torque TXR. When the output current IO is the reverse rotation reference current IXR or more, that is, the load torque TL is the reverse rotation reference torque TXR or more, the control unit 110 repeats step S13.

While step S13 is repeated, the voltage step-up operation of the voltage step-up unit 100 is maintained. That is, in the reverse rotation driving period of the motor 30, as long as the load torque TL is the reverse rotation reference torque TXR or more, the voltage step-up unit 100 performs the voltage step-up operation in reverse rotation. The period in which the load torque TL is the reverse rotation reference torque TXR or more is an example of the initial stage and the intermediate stage of the reverse rotation driving period, and corresponds to "reverse rotation high-load driving period".

When the output current IO is less than the reverse rotation reference current IXR, the control unit 110 determines that the load torque TL is less than the reverse rotation reference torque TXR, and proceeds to step S14.

In step S14, the control unit 110 instructs the voltage step-up unit 100 to stop the voltage step-up operation in reverse rotation. That is, in the reverse rotation driving period of the motor 30, when the load torque TL is less than the reverse rotation reference torque TXR, the voltage step-up unit 100 does not perform the voltage step-up operation in reverse rotation. The period in which the load torque TL is less than the reverse rotation reference torque TXR is an example of the later stage of the reverse rotation driving period, and corresponds to "reverse rotation low-load driving period".

Figure 4:
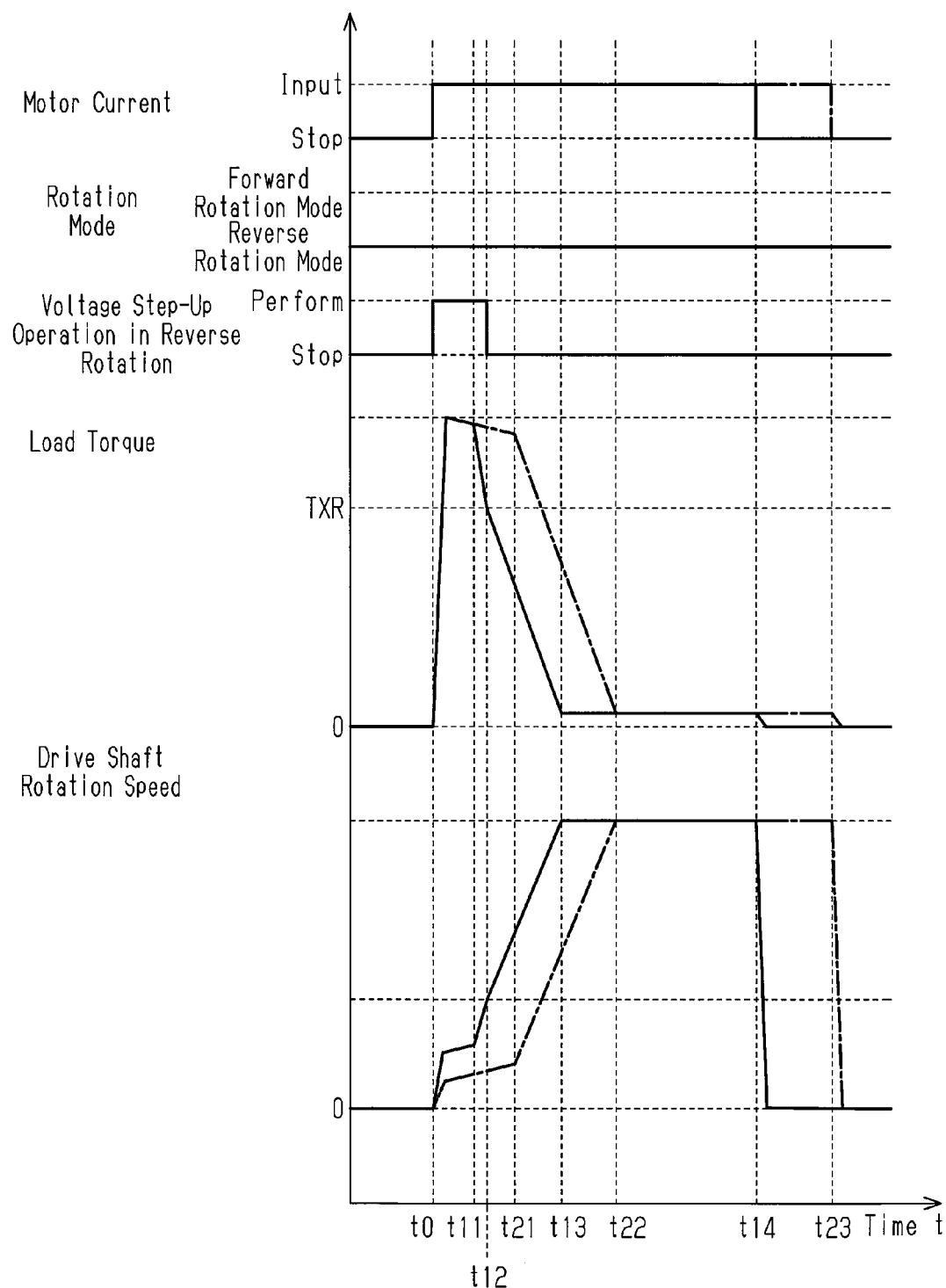
FIG. 4 is a timing chart showing the operation of the electric power tool in the first embodiment.

FIG. 4 shows an example of the operation of the electric power tool 1 and a compared electric power tool.

The compared electric power tool is the same as the electric power tool 1 except that the voltage step-up unit 100 is not provided. A solid line in FIG. 4 indicates an example of the operation of the electric power tool 1. A dashed line in FIG. 4 indicates an example of the operation of the compared electric power tool. The same components of the compared electric power tool as those in the electric power tool 1 are given the same reference numerals, and description thereof is omitted.

First, the operation of the compared electric power tool will now be described.

In a period up to time t0, the compared electric power tool operates as follows.

At turn-on in the compared electric power tool, the control unit 110 is activated. The trigger switch 61 is set to the output stop position, and the rotation direction setting operation unit 62 is set to the reverse rotation setting position. Thus, the drive unit 90 does not supply current to the motor 30. The load torque TL is "0", and the drive shaft rotation speed NM is also "0".

At time t0, the compared electric power tool operates as follows.

When the trigger switch 61 is switched from the output stop position to the maximum output position, the drive unit 90 starts to supply a current to the motor 30. The motor 30 starts to rotate in the reverse rotation mode. Since the compared electric power tool has no voltage step-up unit 100, a voltage is supplied from the power supply 120 to the motor 30 without being raised.

In a period from time t0 to time t21, the compared electric power tool operates as follows.

Immediately after time t0, the load torque TL in the reverse rotation driving period has a maximum value. In the period from time t0 to time t21, the working subject component is seated in the fastened object. Thus, the decrease rate of the fastening torque is low, and the decrease rate of the load torque TL is also low. The drive shaft rotation speed NM, depending on the load torque TL, exhibits a small value. Further, in the period from time t0 to time t21, the increase rate of the drive shaft rotation speed NM is also low.

Immediately after time t21, the compared electric power tool operates as follows.

At time t21, when the state where the working subject component is seated in the fastened object is released, the decrease rate of the fastening torque rises. Then, the load torque TL decreases with the decrease in the fastening torque, and the drive shaft rotation speed NM increases with the decrease in the load torque TL.

In a period from time t21 to time t22, the compared electric power tool operates as follows.

After time t21, when the screwing amount of the working subject component into the fastened object decreases, the fastening torque decreases with the decrease in the frictional force of the screw part. The load torque TL decreases with the decrease in the fastening torque. The drive shaft rotation speed NM increases with the decrease in the load torque TL.

At time t22, the compared electric power tool operates as follows.

At time t22, the working subject component is extracted from the fastened object. At this time, since the trigger switch 61 is pushed inward, the motor 30 rotates without a load. The load torque TL and the drive shaft rotation speed NM keep to be substantially constant.

In a period from time t22 to time t23, the operator performs a preliminary operation for completing the fastening torque decreasing operation. In the general fastening torque decreasing operation, in this period, the trigger switch 61 is kept to be pushed inward. Thus, the motor 30 continues to rotate without a load.

Immediately after time t23, the compared electric power tool operates as follows.

At time t23, the trigger switch 61 is switched from the maximum output position to the output stop position, the drive unit 90 stops supply of the current to the motor 30. Thus, the load torque TL and the drive shaft rotation speed NM decrease.

Next, the operation of the electric power tool 1 in the first embodiment will now be described.

In a period up to time t0, the electric power tool 1 operates as follows.

At turn-on in the electric power tool 1, the control unit 110 is activated. The trigger switch 61 is set to the output stop position, and the rotation direction setting operation unit 62 is set to the reverse rotation setting position. Thus, the drive unit 90 does not supply current to the motor 30. The voltage step-up unit 100 does not perform the voltage step-up operation. The load torque TL is "0", and the drive shaft rotation speed NM is also "0".

At time t0, the electric power tool 1 operates as follows.

At time t0, when the trigger switch 61 is switched from the output stop position to the maximum output position, the drive unit 90 starts to supply a current to the motor 30. The motor 30 starts to rotate in the reverse rotation mode. That is, the reverse rotation driving period of the motor 30 starts. When the reverse rotation driving period of the motor 30 starts, the voltage step-up unit 100 starts the voltage step-up operation in reverse rotation.

In a period from time t0 to time t11, the electric power tool 1 operates as follows.

The voltage step-up unit 100 supplies the raised voltage (output voltage VO) that is higher than the power supply voltage VC to the motor 30. Thus, the increase rate of the drive shaft rotation speed NM from "0" is higher than that in the compared electric power tool. That is, the drive shaft rotation speed NM of the electric power tool 1 exhibits a sharp rising and thus has a larger value than the drive shaft rotation speed NM of the compared electric power tool at the same timing.

Immediately after time t0, the load torque TL in the reverse rotation driving period has a maximum value. In the period from time t0 to time t11, the working subject component is seated in the fastened object. Thus, the decrease rate of the fastening torque is low and, accordingly, the decrease rate of the load torque TL is low. The drive shaft rotation speed NM, depending on the load torque TL, exhibits a small value. Further, in the period from time t0 to time t11, the increase rate of the drive shaft rotation speed NM is also low.

Immediately after time t11, the electric power tool 1 operates as follows.

At time t11, when the state where the working subject component is seated in the fastened object is released, the decrease rate of the fastening torque rises. Then, the load torque TL decreases with the decrease in the fastening torque, and the drive shaft rotation speed NM increases with the decrease in the load torque TL. As described above, at the start timing (time t0), the voltage step-up unit 100 supplies the raised voltage (output voltage VO) to the motor 30. Thus, the timing (time t11) at which seating of the working subject component is released in the electric power tool 1 is earlier than the timing (time t21) at which seating of the working subject component is released in the compared electric power tool.

In a period from time t11 to time t12, the electric power tool 1 operates as follows.

After time t11, when the screwing amount of the working subject component into the fastened object decreases, the fastening torque decreases with the decrease in the frictional force of the screw part. As a result, the load torque TL decreases in the decrease in the fastening torque. The drive shaft rotation speed NM increases with the decrease in the load torque TL. Also during this period, the voltage step-up unit 100 supplies the raised voltage (output voltage VO) to the motor 30. Thus, the state where the torque of the motor 30 is increased is maintained, thereby increasing the decrease rate of the load torque TL.

At time t12, the electric power tool 1 operates as follows.

At time t12, the load torque TL falls below the reverse rotation reference torque TXR. That is, the output current IO falls below the reverse rotation reference current IXR. The operation of the electric power tool 1 shifts from the reverse rotation high-load driving period to the reverse rotation low-load driving period. The control unit 110 determines that the output current IO (output current signal SIO) is less than the reverse rotation reference current IXR (reverse rotation reference current signal SIR), and instructs the voltage step-up unit 100 to stop the voltage step-up operation in reverse rotation.

In a period from time t12 to time t13, the electric power tool 1 operates as follows.

After time t12, the screwing amount of the working subject component into the fastened object further decreases, and the fastening torque further decreases with the decrease in the frictional force of the screw part. The load torque TL further decreases with the decrease in the fastening torque. When the voltage step-up operation in reverse rotation is stopped at time t12, the decrease rate of the load torque TL decreases as compared to the state where the voltage step-up operation in reverse rotation is being performed. The drive shaft rotation speed NM increases with the decrease in the load torque TL. Similarly, when the voltage step-up operation in reverse rotation is stopped, the increase rate of the drive shaft rotation speed NM decreases as compared to the state where the voltage step-up operation in reverse rotation is being performed.

The operation of the electric power tool 1 at time t13 and in a period from time t13 to time t14 is the substantially same as that of the compared electric power tool at time t22 and in a period from time t22 to time t23. The period from time t0 to time t11 is an example of the initial stage of the reverse rotation driving period. The period from time t11 to time t12 is an example of the intermediate stage of the reverse rotation driving period. The period from time t12 to time t13 is an example of the later stage of the reverse rotation driving period.

The electric power tool 1 has following advantages.

(1) The output (torque) required to the motor 30 varies depending on the rotation mode of the motor 30. The voltage step-up unit 100 changes the voltage step-up operation in accordance with whether the rotation mode of the motor 30 is the forward rotation mode or the reverse rotation mode, and supplies a driving voltage according to the output required to the motor 30 to the motor 30. As a result, the driving voltage supplied from the voltage step-up unit 100 to the motor 30 is changed according to the output required to the motor 30. Therefore, power consumption of the power supply 120 may be reduced while ensuring the preferable output of the motor 30.

(2) The output (torque) required to the motor 30 varies depending on the load (load torque TL) of the electric power tool 1. The voltage step-up unit 100 changes the voltage step-up operation in accordance with the rotation mode of the motor 30 and the load torque TL of the tool output shaft 50. As a result, the driving voltage supplied from the voltage step-up unit 100 to the motor 30 may be appropriately changed in accordance with the output required to the motor 30. Therefore, power consumption of the power supply 120 may be reduced while ensuring a preferable output of the motor 30.

(3) In the initial stage and the intermediate stage of the reverse rotation driving period of the motor 30, the voltage step-up unit 100 performs the voltage step-up operation in reverse rotation. Thus, when the working subject component is detached from the fastened object, the fastening torque may be efficiently reduced. As a result, the time required for the fastening torque decreasing operation may be reduced.

(4) In the later stage of the reverse rotation driving period of the motor 30, the voltage step-up unit 100 stops the voltage step-up operation in reverse rotation. Thus, power consumption of the power supply 120 may be reduced.

(5) In the reverse rotation driving period of the motor 30, as long as the load torque TL is the reverse rotation reference torque TXR or more, the voltage step-up unit 100 performs the voltage step-up operation in reverse rotation. In this manner, the voltage step-up unit 100 performs the voltage step-up operation based on the load torque TL. Thus, the output required for the motor 30 is preferably ensured.

(6) In the reverse rotation driving period of the motor 30, when the load torque TL is less than the reverse rotation reference torque TXR, the voltage step-up unit 100 does not perform the voltage step-up operation in reverse rotation. Therefore, power consumption of the power supply 120 may be reduced.

(7) The electric power tool 1 includes the voltage step-up operation setting operation unit 63 and the voltage step-up operation setting detector 73. Therefore, the user may use the operation unit 63 to set the voltage step-up operation of the voltage step-up unit 100, thereby acquiring the output of the motor 30 which is suitable for the operation. This improves the convenience of the electric power tool 1.

Second Embodiment

Next, an electric power tool 1 according to a second embodiment will now be described.

The electric power tool 1 in the second embodiment basically includes the same components as those in the electric power tool 1 in the first embodiment. The same components are given the same reference numerals.

The electric power tool 1 in the second embodiment is different from the electric power tool 1 in the first embodiment mainly in following points. The voltage step-up unit 100 in the first embodiment performs the voltage step-up operation in reverse rotation in the reverse rotation driving period of the motor 30. The voltage step-up unit 100 in the second embodiment performs the voltage step-up operation in reverse rotation in the reverse rotation driving period of the motor 30, and performs the voltage step-up operation in forward rotation in the forward rotation driving period of the motor 30. The forward rotation driving period represents a period from start of forward rotation of the motor 30 to stop of forward rotation of the motor 30.

In the electric power tool 1 in the second embodiment, the control unit 110 performs forward rotation mode voltage step-up control. In the forward rotation mode voltage step-up control, the control unit 110 controls the voltage step-up unit 100 in accordance with a signal from the operation detection unit 70 or a signal from the load detection unit 80. The forward rotation mode voltage step-up control is achieved by using hardware, for example. The control unit 110 controls the operation of each functional block in the control unit 110 formed by hardware, thereby performing the forward rotation mode voltage step-up control.

The forward rotation mode voltage step-up control has a following technical aspect. Following description is only an example of one aspect of the forward rotation mode voltage step-up control, and does not intend to limit the forward rotation mode voltage step-up control to specific control based on the following description. Thus, the forward rotation mode voltage step-up control may be performed from an aspect other than the aspect described below.

The forward rotation mode of the motor 30 is used mainly in a fastening torque increasing operation of increasing the fastening torque of a working subject component (for example, a screw etc.). The fastening torque increasing operation typically includes an operation of fastening the working subject component to a fastened object by a given fastening torque.

When the motor 30 rotates in the forward rotation mode in the fastening torque increasing operation, a high load torque TL acts on the tool output shaft 50 after the working subject component is seated in the fastened object. Thus, in the case where the output of the motor 30 is not a preferable output, time required to complete the fastening torque increasing operation becomes long. Therefore, it is preferable that when the motor 30 rotates in the forward rotation mode, the voltage supplied to the motor 30 be high.

When the motor 30 rotates in the forward rotation mode, the voltage step-up unit 100 raises the voltage from the power supply 120 and supplies the raised voltage to the motor 30. This may ensure the preferable output of the motor 30 while reducing time required for the fastening torque increasing operation.

In the case where the voltage step-up operation of the voltage step-up unit 100 is performed, as compared to the case where the voltage step-up operation is not performed, power consumption of the power supply 120 becomes larger. Thus, the use of the voltage step-up unit 100 may reduce the fastening torque increasing operation but increase the number of times the power supply 120 (battery pack) is replaced.

Thus, the electric power tool 1 in the second embodiment performs the forward rotation mode voltage step-up control so as to achieve both of reduction of time required for the fastening torque increasing operation and reduction of power consumption of the power supply 120.

The control unit 110 performs the forward rotation mode voltage step-up control as follows.

In an initial stage of the forward rotation driving period, the control unit 110 instruct the voltage step-up unit 100 to refrain from performing the voltage step-up operation in forward rotation. When the screwing amount of the working subject component into the fastened object is small, the frictional force and the axial force of the screw part are sufficiently small.

That is, the fastening torque of the working subject component is sufficiently small. Thus, even when the torque of the motor 30 is small in the initial stage of the forward rotation driving period, the fastening torque may be efficiently increased.

Accordingly, in the initial stage of the forward rotation driving period, the control unit 110 instructs the voltage step-up unit 100 to refrain from performing the voltage step-up operation in forward rotation. This may reduce power consumption of the power supply 120.

In an intermediate stage of the forward rotation driving period, the control unit 110 instructs the voltage step-up unit 100 to start the voltage step-up operation in forward rotation. When the working subject component is not seated in the seat part of the fastened object, the frictional force of the screw part of the working subject component mainly contributes to the fastening torque. After that, as the screwing amount of the working subject component into the fastened object increases, the frictional force of the screw part increases.

Thus, the fastening torque of the working subject component is larger in the intermediate stage of the forward rotation driving period than in the initial stage. When the torque of the motor 30 in the intermediate stage of the forward rotation driving period is the same as that in the initial stage, a sufficient fastening torque may not be acquired in the intermediate stage of the forward rotation driving period.

Accordingly, in the intermediate stage of the forward rotation driving period, the control unit 110 instructs the voltage step-up unit 100 to start the voltage step-up operation in forward rotation. Thereby, the raised voltage suitable for the forward rotation mode is supplied to the motor 30 to reduce time required for the fastening torque increasing operation.

In a later stage of the forward rotation driving period of the motor 30, the control unit 110 instructs the voltage step-up unit 100 to still perform the voltage step-up operation in forward rotation. After the working subject component is seated in the seat part of the fastened object, the frictional force between the working subject component and the fastened object increases.

Thus, the fastening torque of the working subject component is larger in the later stage of the forward rotation driving period than in the initial stage. When the torque of the motor 30 in the later stage of the forward rotation driving period is small, a sufficient fastening torque may not be acquired.

Accordingly, in the later stage of the forward rotation driving period, the control unit 110 instructs the voltage step-up unit 100 to still perform the voltage step-up operation in forward rotation. This maintains the state where the torque of the motor 30 is increased to acquire the suitable fastening torque.

Figure 5:
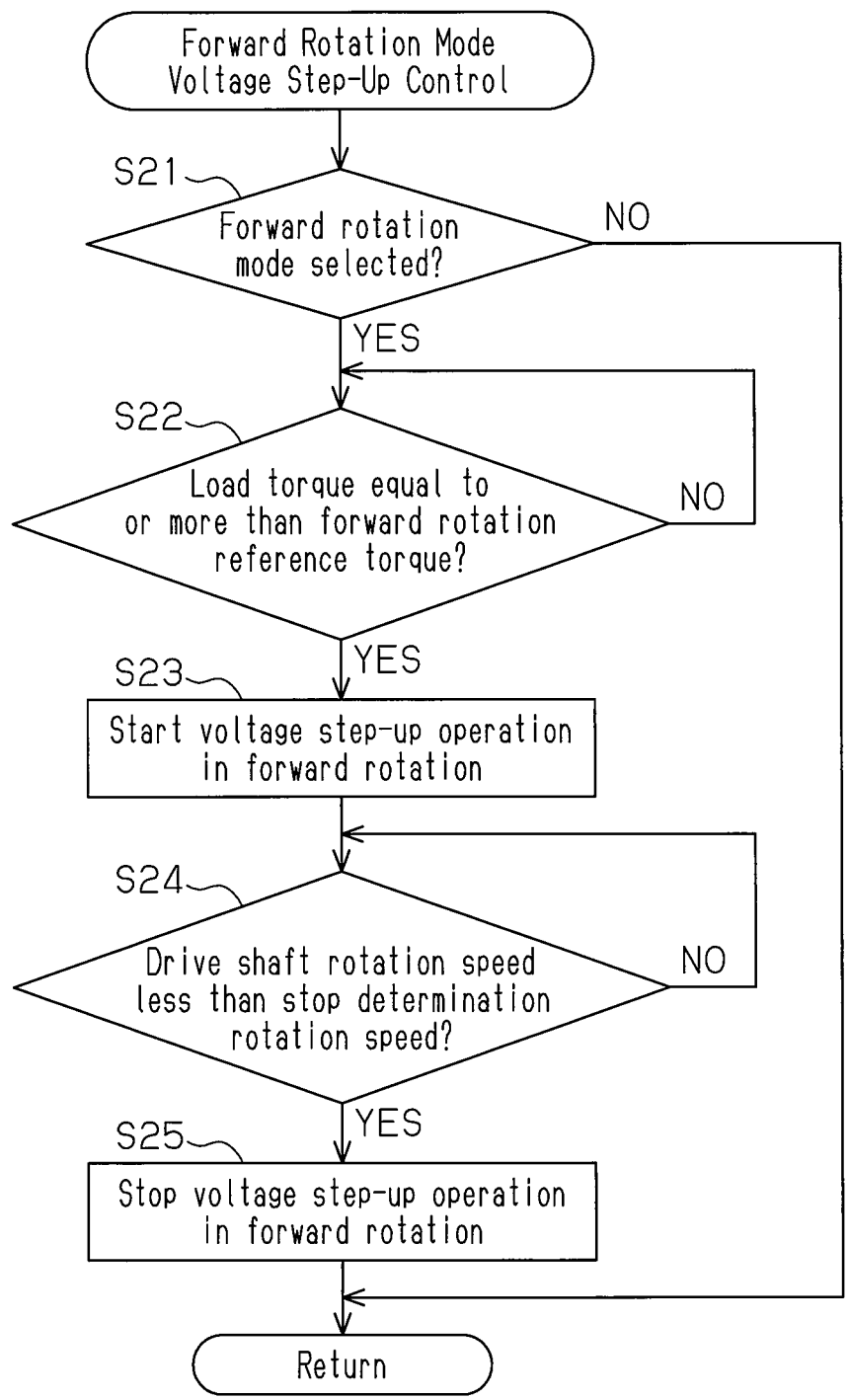
FIG. 5 is a flow chart showing control of an electric power tool in a second embodiment.

FIG. 5 is a flow chart showing the forward rotation mode voltage step-up control.

At a timing at which forward rotation of the motor 30 starts, the control unit 110 starts the forward rotation mode voltage step-up control. For example, when receiving the trigger operation signal SS from the trigger operation detector 71, the control unit 110 starts the forward rotation mode voltage step-up control.

In step S21, the control unit 110 determines whether or not the rotation mode of the motor 30 is set (selected) to the forward rotation mode. When receiving the forward rotation setting signal SF from the rotation direction setting detector 72, the control unit 110 determines that the forward rotation mode is set. When the forward rotation mode is not set, the control unit 110 finishes the forward rotation mode voltage step-up control. When the forward rotation mode is set, the control unit 110 proceeds to step S22.

In step S22, the control unit 110 determines whether or not the load torque TL is equal to or more than a forward rotation reference torque TXF. For example, the control unit 110 determines whether or not the load torque TL is equal to or more than the forward rotation reference torque TXF based on the output current signal SIO and a forward rotation reference current signal SIF. The forward rotation reference current signal SIF that indicates a forward rotation reference current IXF is supplied to the control unit 110. The forward rotation reference torque TXF corresponds to "forward rotation reference load".

When the load torque TL is the forward rotation reference torque TXF or more, the output current IO is the forward rotation reference current IXF or more. Thus, when the output current IO is the forward rotation reference current IXF or more, the control unit 110 determines that the load torque TL is the forward rotation reference torque TXF or more. When the output current IO is less than the forward rotation reference current IXF, that is, the load torque TL is less than the forward rotation reference torque TXF, the control unit 110 repeats step S22.

As long as step S22 is repeated, the voltage step-up operation of the voltage step-up unit 100 is not performed. That is, the voltage step-up unit 100 does not perform the voltage step-up operation in forward rotation in the period in which the load torque TL is less than the forward rotation reference torque TXF in the forward rotation driving period of the motor 30. The period in which the load torque TL is less than the forward rotation reference torque TXF is an example of the initial stage of the forward rotation driving period, and corresponds to "forward rotation low-load driving period". The period in which the load torque TL is the forward rotation reference torque TXF or more is an example of the intermediate stage and the later stage of the forward rotation driving period, and corresponds to "forward rotation high-load driving period".

When the output current IO is the forward rotation reference current IXF or more, the control unit 110 determines that the load torque TL is the forward rotation reference torque TXF or more, and proceeds to step S23.

In step S23, the control unit 110 instructs the voltage step-up unit 100 to start the voltage step-up operation in forward rotation. The control unit 110 supplies the voltage step-up driving setting signal SUI to the voltage step-up unit 100. The voltage step-up unit 100 drives the switching element 102 according to the voltage step-up driving setting signal SUI.

In step S24, the control unit 110 determines whether or not the drive shaft rotation speed NM is less than a stop determination rotation speed NMX. For example, the control unit 110 determines whether or not the drive shaft rotation speed NM is less than the stop determination rotation speed NMX based on a calculation value of the drive shaft rotation speed NM and a stop determination rotation speed signal SMX. The stop determination rotation speed signal SMX that indicates the stop determination rotation speed NMX is supplied to the control unit 110.

When the calculation value of the drive shaft rotation speed NM is the stop determination rotation speed signal SMX or more, the control unit 110 determines that the drive shaft rotation speed NM is the stop determination rotation speed NMX or more, and repeats step S24. When the calculation value of the drive shaft rotation speed NM is less than the stop determination rotation speed signal SMX, the control unit 110 determines that the drive shaft rotation speed NM is less than the stop determination rotation speed NMX, and proceeds to step S25.

In step S25, the control unit 110 instructs the voltage step-up unit 100 to stop the voltage step-up operation in forward rotation. That is, when the fastening torque increasing operation is completed, the voltage step-up unit 100 stops the voltage step-up operation in forward rotation.

Figure 6:
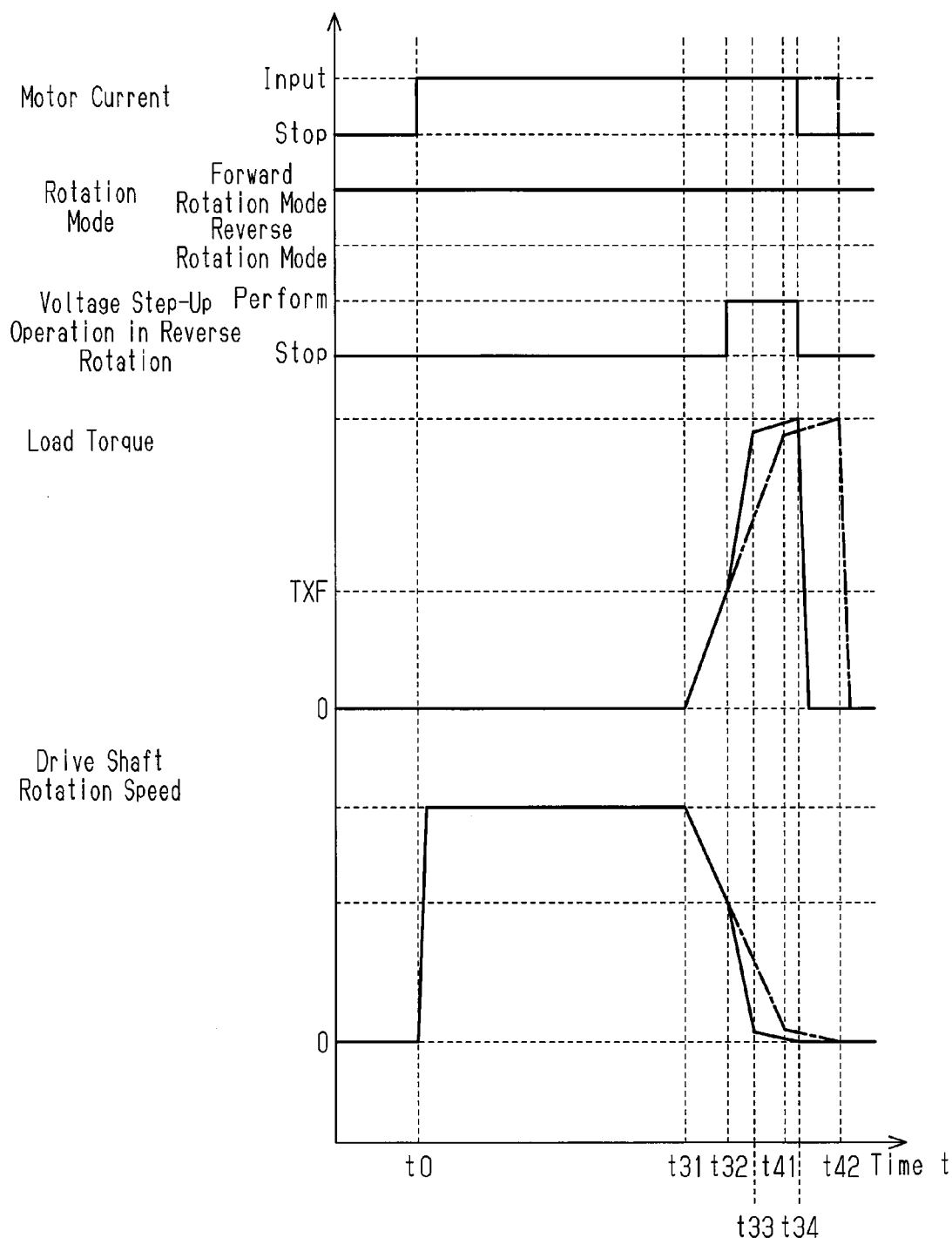
FIG. 6 is a timing chart showing the operation of the electric power tool in the second embodiment.

FIG. 6 shows an example of the operation of the electric power tool 1 and a compared electric power tool.

The compared electric power tool is the same as the electric power tool 1 except that the voltage step-up unit 100 is not provided. A solid line in FIG. 6 indicates an example of the operation of the electric power tool 1. A dashed line in FIG. 6 shows an example of the operation of the compared electric power tool. The same components of the compared electric power tool as those of the electric power tool 1 are given the same reference numerals.

First, the operation of the compared electric power tool will be described.

In a period up to time to, a following state is found.

At turn-on in the compared electric power tool, the control unit 110 is activated. The trigger switch 61 is set to the output stop position, and the rotation direction setting operation unit 62 is set to the forward rotation operational position. Thus, the drive unit 90 does not current to the motor 30. The load torque TL is "0", and the drive shaft rotation speed NM is also "0".

At time t0, the compared electric power tool operates as follows.

When the trigger switch 61 is switched from the output stop position to the maximum output position, the drive unit 90 starts to supply a current to the motor 30. The motor 30 starts to rotate in the forward rotation mode without a load.

In a period from time t0 to time t31, the operator performs a preliminary operation for starting the fastening torque increasing operation. In the general fastening torque increasing operation, in this period, the trigger switch 61 is kept to be pushed inward. Thus, the motor 30 continues to rotate without a load. The drive shaft rotation speed NM exhibits rising change.

At time t31, the compared electric power tool operates as follows.

The working subject component is screwed into the fastened object. The fastening torque starts to increase, and the load torque TL increases with the increase in the fastening torque. The drive shaft rotation speed NM starts to decrease with the increase in the load torque TL.

In a period from time t31 to time t41, the compared electric power tool operates as follows.

The screwing amount of the working subject component into the fastened object gradually increases. The fastening torque increases with the increase in the frictional force of the screw part. The load torque TL decreases with the decrease in the fastening torque. The drive shaft rotation speed NM increases with the decrease in the load torque TL.

At time t41, the compared electric power tool operates as follows.

The working subject component is seated in the seat part of the fastened object. Thus, the increase rate of the fastening torque decreases and, accordingly, the increase rate of the load torque TL also decreases. Further, the decrease rate of the drive shaft rotation speed NM decreases with the decrease in the increase rate of the load torque TL.

In a period from time t41 to time t42, the compared electric power tool operates as follows.

The working subject component rotates with being seated in the fastened object. Therefore, the increase rate of the fastening torque is low, the increase rate of the load torque TL is low, and the decrease rate of the drive shaft rotation speed NM is also low.

At time t42, the compared electric power tool operates as follows.

The drive shaft rotation speed NM falls below a stop determination times NMX. The control unit 110 supplies the rotation stop signal ES to the drive unit 90. Accordingly, supply of the current from the drive unit 90 to the motor 30 is stopped.

Next, the operation of the electric power tool 1 will now be described.

In a period up to time t0, electric power tool 1 operates as follows.

At turn-on in the electric power tool 1, the control unit 110 is activated. The trigger switch 61 is set to the output stop position, and the rotation direction setting operation unit 62 is set to the forward rotation operational position. Thus, the drive unit 90 does not supply current to the motor 30. The voltage step-up unit 100 does not perform the voltage step-up operation. The load torque TL is "0", and the drive shaft rotation speed NM is also "0".

The operation of the electric power tool 1 at time t0 is the substantially same as that of the compared electric power tool at time t0. The operation of the electric power tool 1 in the period from time t0 to time t31 is the substantially same as that of the compared electric power tool in the period from time t0 to time t31. The operation of the electric power tool 1 at time t31 is the substantially same as that of the compared electric power tool at time t31. The operation of the electric power tool 1 in the period from time t31 to time t32 is the substantially same as that of the compared electric power tool in the period from time t31 to time t32.

At time t32, the electric power tool 1 operates as follows.

The output current IO increases to the forward rotation reference current IXF or more, and the load torque TL increases to the forward rotation reference torque TXF or more. The control unit 110 determines that the load torque TL is the forward rotation reference torque TXF or more based on comparison between the output current signal SIO and the reverse rotation reference current signal SIR. Thus, the control unit 110 instructs the voltage step-up unit 100 to start the voltage step-up operation in forward rotation.

In a period from time t32 to time t33, the electric power tool 1 operates as follows.

The voltage step-up unit 100 supplies the raised voltage (output voltage VO) that is higher than the power supply voltage VC to the motor 30. That is, the voltage step-up unit 100 performs the voltage step-up operation in forward rotation. Thus, in the period from time t32 to time t33, the increase rate of the fastening torque (load torque TL) of the electric power tool 1 is higher than the increase rate of the fastening torque of the compared electric power tool (load torque TL). Therefore, the decrease rate of the drive shaft rotation speed NM of the electric power tool 1 is higher than the decrease rate of the drive shaft rotation speed NM of the compared electric power tool.

The screwing amount of the working subject component into the fastened object gradually increases, and the fastening torque increases with the increase in the frictional force of the screw part. Then, the load torque TL increases with the increase in the fastening torque. The drive shaft rotation speed NM decreases with the increase in the load torque TL.

At time t33, the electric power tool 1 operates as follows.

The working subject component is seated in the seat part of the fastened object. Thus, the increase rate of the fastening torque decreases and accordingly, the increase rate of the load torque TL decreases. Further, the decrease rate of the drive shaft rotation speed NM decreases with the decrease in the increase rate of the load torque TL. As described above, the voltage step-up unit 100 supplies the raised voltage (output voltage VO) to the motor 30 at time t32. Thus, the timing (time t33) at which the working subject component is seated in the fastened object in the electric power tool 1 is earlier than the timing (time t41) at which the working subject component is seated in the fastened object in the compared electric power tool.

In a period from time t33 to time t34, the electric power tool 1 operates as follows.

The working subject component rotates with being seated in the seat part of the fastened object. Thus, the increase rate of the fastening torque is low, the increase rate of the load torque TL is low, and the decrease rate of the drive shaft rotation speed NM is also low.

At time t34, the electric power tool 1 operates as follows.

The drive shaft rotation speed NM falls below the stop determination times NMX. The control unit 110 supplies the rotation stop signal ES to the drive unit 90. Thus, supply of the current from the drive unit 90 to the motor 30 is stopped. A period from time t0 to time t32 is an example of the initial stage of the forward rotation driving period. A period from time t32 to time t33 is an example of the intermediate stage of the forward rotation driving period. A period from time t33 to time t34 is an example of the later stage of the forward rotation driving period.

The electric power tool 1 in the second embodiment has the advantages (1) to (7) achieved in the electric power tool 1 in the first embodiment. The electric power tool 1 in the second embodiment further has following advantages.

(8) In the intermediate stage and the later stage of the forward rotation driving period of the motor 30, the voltage step-up unit 100 performs the voltage step-up operation in forward rotation. Accordingly, the fastening torque immediately before the working subject component is seated in the fastened object and the fastening torque immediately after the working subject component is seated in the fastened object may be efficiently increased. As a result, time required for the fastening torque increasing operation may be reduced.

(9) In the initial stage of the forward rotation driving period of the motor 30, the voltage step-up unit 100 does not perform the voltage step-up operation in forward rotation. Thus, power consumption of the power supply 120 is reduced.

(10) In the forward rotation driving period of the motor 30, when the load torque TL is the forward rotation reference torque TXF or more, the voltage step-up unit 100 performs the voltage step-up operation in forward rotation. In this manner, the voltage step-up unit 100 performs the voltage step-up operation based on the load torque TL. Thus, the preferable output of the motor 30 is ensured in the required period.

(11) In the forward rotation driving period of the motor 30, when the load torque TL is less than the forward rotation reference torque TXF, the voltage step-up unit 100 does not perform the voltage step-up operation in forward rotation. Thus, power consumption of the power supply 120 is reduced.

It should be apparent to those skilled in the art that the present invention may be embodied in many other specific forms without departing from the spirit or scope of the invention. Particularly, each of the above embodiments may be modified as follows. Following two or more modification examples may be combined to each other so as not to technically contradict each other.

In the first embodiment, the load detection unit 80 indirectly detects the load torque TL acting on the tool output shaft 50. In place of this, in a modification example, the load detection unit 80 may directly detect the load torque TL. The load detection unit 80 in the modification example may use, for example, a torque sensor. The torque sensor supplies a load torque signal corresponding to the load torque of the tool output shaft 50 to the control unit 110. The load detection unit 80 in the second embodiment may be also modified in the same manner.

In the first embodiment, the rotation speed detector 85 generates the detection rotation speed signal SN corresponding to the rotation speed of the drive shaft 32. In place of this, in a modification example, the rotation speed detector 85 may generate the detection rotation speed signal SN corresponding to the rotation speed of the tool output shaft 50. The rotation speed detector 85 in the second embodiment may be also modified in the same manner.

In the first embodiment, the voltage step-up unit 100 does not perform the voltage step-up operation in reverse rotation in the later stage of the reverse rotation driving period. In place of this, in a modification example, the voltage step-up unit 100 may make the voltage step-up level in the later stage of the reverse rotation driving period smaller than that in the initial stage or the intermediate stage to perform the voltage step-up operation in reverse rotation.

In the first embodiment, in the intermediate stage of the reverse rotation driving period the voltage step-up unit 100 performs the voltage step-up operation in reverse rotation. In place of this, in a modification example, in the intermediate stage of the reverse rotation driving period, the voltage step-up unit 100 may stop the voltage step-up operation in reverse rotation, or perform the voltage step-up operation in reverse rotation with a smaller voltage step-up level than the voltage step-up level in the initial stage.

In the first embodiment, in the reverse rotation low-load driving period in which the load torque TL is less than the reverse rotation reference torque TXR, the voltage step-up unit 100 stops the voltage step-up operation in reverse rotation. In place of this, in a modification example, in the reverse rotation low-load driving period, the voltage step-up unit 100 may perform the voltage step-up operation in reverse rotation with the smaller voltage step-up level than the voltage step-up level in the reverse rotation high-load driving period.

In the first embodiment, the reverse rotation mode voltage step-up control is achieved by using hardware. In place of this, in a modification example, the reverse rotation mode voltage step-up control is achieved by using software (program) or a combination of software and hardware. At least one of the reverse rotation mode voltage step-up control and the forward rotation mode voltage step-up control in the second embodiment may be also modified in the same manner.

In the first embodiment, the electric power tool body 10 includes a voltage step-up unit 100 and a control unit 110. In place of this, in a modification example, at least one of the voltage step-up unit 100 and the control unit 110 is provided in the power supply 120. The electric power tool 1 in the second embodiment may be also modified in the same manner.

In the first embodiment, the electric power tool 1 includes the power supply 120 that may be attached to and detached from the electric power tool body 10. In place of this, in a modification example, the power supply 120 has following structure (a) or (b). The power supply 120 in the second embodiment may be also modified in the same manner.

(a) The electric power tool 1 includes a first modified power supply in place of the power supply 120. The first modified power supply may be attached to and detached from the electric power tool body 10, and may receive power from a commercial AC power supply.

(b) The electric power tool 1 includes a second modified power supply in place of the power supply 120. The second modified power supply is integrated with the electric power tool body 10, and may receive power from a primary battery, a secondary battery, or a commercial AC power supply.

In the second embodiment, the voltage step-up unit 100 performs the voltage step-up operation in reverse rotation in the intermediate stage of the forward rotation driving period. In place of this, in a modification example, in the intermediate stage of the forward rotation driving period, the voltage step-up unit 100 may stop the voltage step-up operation in forward rotation, or perform the voltage step-up operation in forward rotation with smaller voltage step-up level than the voltage step-up level in the later stage.

In the second embodiment, in the initial stage of the forward rotation driving period, the voltage step-up unit 100 does not perform the voltage step-up operation in forward rotation. In place of this, in a modification example, in the initial stage of the forward rotation driving period, the voltage step-up unit 100 performs the voltage step-up operation in forward rotation, or performs the voltage step-up operation in forward rotation at a smaller voltage step-up level than the voltage step-up level in the intermediate stage or the later stage.

The invention claimed is:

1. An electric power tool comprising:
a power supply;
a motor capable of being driven in a forward rotation mode or a reverse rotation mode; and
a voltage step-up unit capable of performing a voltage step-up operation to raise a voltage supplied from the power supply and supply a raised voltage to the motor, wherein
the voltage step-up unit is configured to:
change the voltage step-up operation in accordance with whether a rotation mode of the motor is the forward rotation mode or the reverse rotation mode;
perform the voltage step-up operation in an initial stage of a reverse rotation driving period from start of reverse rotation of the motor to stop of reverse rotation of the motor; and
perform the voltage step-up operation with a smaller voltage step-up level than that in the initial stage, or stop the voltage step-up operation, in at least part of the reverse rotation driving period after the initial stage.

2. The electric power tool according to claim 1, wherein the voltage step-up unit is configured to change the voltage step-up operation in accordance with the rotation mode of the motor and a load of the electric power tool.

3. An electric power tool, comprising:
a power supply;
a motor capable of being driven in a forward rotation mode or a reverse rotation mode; and
a voltage step-up unit capable of performing a voltage step-up operation to raise a voltage supplied from the power supply and supply a raised voltage to the motor, wherein
the voltage step-up unit is configured to:
change the voltage step-up operation in accordance with whether a rotation mode of the motor is the forward rotation mode or the reverse rotation mode;
perform the voltage step-up operation in a reverse rotation high-load driving period in which a load of the electric power tool is equal to or more than a reverse rotation reference load during a reverse rotation driving period from start of reverse rotation of the motor to stop of reverse rotation of the motor; and
perform the voltage step-up operation with a smaller voltage step-up level than that in the reverse rotation high-load driving period, or stop the voltage step-up operation, in a reverse rotation low-load driving period in which the load of the electric power tool is less than the reverse rotation reference load during the reverse rotation driving period.

4. The electric power tool according to claim 3, wherein the voltage step-up unit is configured to:
start the voltage step-up operation at a start timing of the reverse rotation driving period; and
stop the voltage step-up operation when the operation of the electric power tool shifts from the reverse rotation high-load driving period to the reverse rotation low-load driving period.

5. An electric power tool, comprising:
a power supply;

a motor capable of being driven in a forward rotation mode or a reverse rotation mode; and a voltage step-up unit capable of performing a voltage step-up operation to raise a voltage supplied from the power supply and supply a raised voltage to the motor, wherein the voltage step-up unit is configured to:
  change the voltage step-up operation in accordance with whether a rotation mode of the motor is the forward rotation mode or the reverse rotation mode;
  perform the voltage step-up operation in a later stage of a forward rotation driving period from start of forward rotation of the motor to stop of forward rotation of the motor; and
  perform the voltage step-up operation with a smaller voltage step-up level than that in the later stage, or stop the voltage step-up operation, in at least part of the forward rotation driving period before the later stage.

6. An electric power tool, comprising:
a power supply;
a motor capable of being driven in a forward rotation mode or a reverse rotation mode; and
a voltage step-up unit capable of performing a voltage step-up operation to raise a voltage supplied from the power supply and supply a raised voltage to the motor, wherein the voltage step-up unit is configured to:
  change the voltage step-up operation in accordance with whether a rotation mode of the motor is the forward rotation mode or the reverse rotation mode;
  perform the voltage step-up operation in a forward rotation high-load driving period in which a load of the electric power tool is equal to or more than a forward rotation reference load during a forward rotation driving period from start of forward rotation of the motor to stop of forward rotation of the motor; and
  perform the voltage step-up operation with a smaller voltage step-up level than that in the forward rotation high-load driving period, or stop the voltage step-up operation, in a forward rotation low-load driving period in which the load of the electric power tool is less than the forward rotation reference load during the forward rotation driving period.

7. The electric power tool according to claim 6, wherein the voltage step-up unit is configured to:
  refrain from performing the voltage step-up operation at a start timing of the forward rotation driving period; and
  start the voltage step-up operation when the operation of the electric power tool shifts from the forward rotation low-load driving period to the forward rotation high-load driving period.

8. The electric power tool according to claim 1, further comprising:
  a voltage step-up operation setting operation unit serving as a human machine interface;
  a voltage step-up operation setting detector configured to generate a voltage step-up setting signal corresponding to the operation of the voltage step-up operation setting operation unit; and
  a control unit configured to control the voltage step-up unit in accordance with the voltage step-up setting signal.

9. The electric power tool according to claim 1, further comprising
  a control unit configured to control the voltage step-up operation of the voltage step-up unit in accordance with the rotation mode of the motor and a load of the electric power tool.

10. The electric power tool according to claim 9, wherein the control unit is configured to switch the voltage step-up operation of the voltage step-up unit between the forward rotation mode and the reverse rotation mode.

11. The electric power tool according to claim 9, further comprising
  a load detection unit configured to generate a load detection signal corresponding to the load of the electric power tool and control the voltage step-up operation of the voltage step-up unit in accordance with the load detection signal.

12. The electric power tool according to claim 9, further comprising:
  a rotation direction setting operation unit serving as a human machine interface, the rotation direction setting operation unit being selectively switched to a forward rotation setting position or a reverse rotation setting position; and
  a rotation direction setting detector configured to generate a forward rotation setting signal when the rotation direction setting operation unit is located at the forward rotation setting position and generate a reverse rotation setting signal when the rotation direction setting operation unit is located at the reverse rotation setting position,
  wherein the control unit is configured to:
    drive the motor in the forward rotation mode in accordance with the forward rotation setting signal;
    drive the motor in the reverse rotation mode in accordance with the reverse rotation setting signal; and
    control the voltage step-up operation of the voltage step-up unit in accordance with whether to receive the forward rotation setting signal or the reverse rotation setting signal.

* * * * *